United States Patent
Obermayr

(10) Patent No.: US 11,971,388 B2
(45) Date of Patent: Apr. 30, 2024

(54) TEST DEVICE

(71) Applicant: Siemens Energy Global GmbH & Co. KG, Munich (DE)

(72) Inventor: Stefan Obermayr, Duisburg (DE)

(73) Assignee: Siemens Energy Global GmbH & Co. KG, Munich (DE)

(*) Notice: Subject to any disclaimer, the term of this patent is extended or adjusted under 35 U.S.C. 154(b) by 674 days.

(21) Appl. No.: 17/050,902

(22) PCT Filed: Apr. 25, 2019

(86) PCT No.: PCT/EP2019/060587
§ 371 (c)(1),
(2) Date: Oct. 27, 2020

(87) PCT Pub. No.: WO2019/223950
PCT Pub. Date: Nov. 28, 2019

(65) Prior Publication Data
US 2021/0231620 A1   Jul. 29, 2021

(30) Foreign Application Priority Data

May 25, 2018   (DE) ................. 10 2018 208 293.6

(51) Int. Cl.
*G01N 29/265*   (2006.01)
*F01D 21/00*    (2006.01)
(Continued)

(52) U.S. Cl.
CPC ......... *G01N 29/265* (2013.01); *F01D 21/003* (2013.01); *F01D 25/285* (2013.01); *G01N 29/043* (2013.01); *G01N 2291/2693* (2013.01)

(58) Field of Classification Search
CPC .. G01N 29/265; G01N 29/043; G01N 29/225; G01N 29/04; G01N 29/27;
(Continued)

(56) References Cited

U.S. PATENT DOCUMENTS 5,195,392 A * 3/1993 Moore ................ F16L 55/18
356/241.3
5,335,546 A * 8/1994 Karbach .............. G01N 29/26
73/644
(Continued)

FOREIGN PATENT DOCUMENTS

EP   2428650 A1   3/2012
JP   H0416758 A   1/1992
(Continued)

OTHER PUBLICATIONS

PCT International Search Report and Written Opinion of International Searching Authority dated Jul. 15, 2019 corresponding to PCT International Application No. PCT/EP2019/060587 filed Apr. 25, 2019.

*Primary Examiner* — Jacques M Saint Surin

(57) ABSTRACT

A test device for a destruction-free test of rotationally symmetrical objects, in particular rotors of gas or steam turbines. The test device has at least three elongated skid bodies which extend in the circumferential direction and parallel to one another, which are interconnected, and which define contact surfaces for positioning on the circumferential surface of the object to be tested, wherein a test body receiving area for an ultrasonic test probe is provided at least on the center skid body.

20 Claims, 3 Drawing Sheets

(51) Int. Cl.
   *F01D 25/28* (2006.01)
   *G01N 29/04* (2006.01)
(58) Field of Classification Search
   CPC ..... G01N 2291/106; G01N 2291/2693; G01N 2291/011; F01D 21/003; F01D 25/285; G10K 11/004
   USPC .......................................................... 73/623
   See application file for complete search history.

(56) References Cited

U.S. PATENT DOCUMENTS

| | | | | |
|---|---|---|---|---|
| 5,599,026 | A * | 2/1997 | Sanders | ............... F16J 15/4472 |
| | | | | 415/174.4 |
| 7,017,414 | B2 * | 3/2006 | Falsetti | .................. G01N 29/30 |
| | | | | 73/628 |
| 7,654,144 | B2 * | 2/2010 | Yoon | ..................... G01N 29/225 |
| | | | | 73/639 |
| 7,975,549 | B2 * | 7/2011 | Fetzer | ..................... G01N 29/28 |
| | | | | 73/644 |
| 9,291,603 | B2 | 3/2016 | Thommen-Stamenkov et al. | |
| 10,036,665 | B2 * | 7/2018 | Bergman | ................ G01H 1/006 |
| 2012/0006132 | A1 | 1/2012 | Faucher et al. | |
| 2015/0300994 | A1 | 10/2015 | Yamaji et al. | |

FOREIGN PATENT DOCUMENTS

| | | | |
|---|---|---|---|
| JP | 2005077320 A | 3/2005 | |
| JP | 4049985 B2 | 2/2008 | |
| WO | 2010026036 A1 | 3/2010 | |

* cited by examiner

TEST DEVICE

CROSS REFERENCE TO RELATED APPLICATIONS

This application is the U.S. National Stage of International Application No. PCT/EP2019/060587 filed 25 Apr 2019, and claims the benefit thereof. The International Application claims the benefit of German Application No. DE 10 2018 208 293.6 filed 25 May 2018. All of the applications are incorporated by reference herein in their entirety.

FIELD OF INVENTION

The present invention relates to an inspection device for non-destructive inspection of rotationally symmetrical objects, in particular rotors of gas or steam turbines.

BACKGROUND OF INVENTION

Rotors of gas or steam turbines must be checked at regular intervals for defects, in particular in the form of cracks. Such cracks often occur in the blade grooves formed on the rotor, in which the turbine blades are accommodated. For non-destructive crack inspection, ultrasonic sensors are usually used, which are realized as single-channel or multi-channel ultrasonic probes (phased arrays) and which perform running time determinations. For the inspection, one or more ultrasonic probes of an inspection device must be guided as precisely as possible along the blade roots held in the blade grooves of the rotor, in order to scan the blade grooves for cracks.

Inspection devices suitable for performing crack detection are known in various designs, for example those that are positioned next to a dismounted rotor that is rotatably mounted on bearing blocks. To effect a relative movement between the inspection device and the rotor, the latter is rotated, in order to move the ultrasonic probe(s) in the circumferential direction along a blade groove of the rotor. However, rotatable mounting of the rotor on suitable bearing blocks involves a great deal of effort and correspondingly high costs. Alternatively, it is known to design an inspection device as a vehicle that has a vehicle chassis and motor-driven wheels. Accordingly, the vehicle can be moved on the circumferential surface of the rotor to be inspected, in the circumferential direction along a blade groove. Such a vehicle is described, for example, in EP 2 428 650 B1. The necessary holding of the vehicle on the rotor is realised by means of magnets, which are provided either on the wheels or on the underside of the vehicle chassis. The distance travelled on the circumferential surface of the rotor is advantageously recorded by means of a travel transducer, such that the measured values recorded by the ultrasonic probes can be assigned to circumferential positions on the rotor. A disadvantage of the vehicle described in EP 2 428 650 B1, however, is that its structure is quite complex, and thus expensive. Another disadvantage is the relatively high net weight. On the one hand, it makes it more difficult to transport the inspection device. On the other hand, the magnets have to generate high forces in order to be able to hold the vehicle securely on the rotor, even overhead.

SUMMARY OF INVENTION

Based on this prior art, it is an object of the present invention is to create an inspection device, of the type mentioned at the outset, that has an alternative, simple and inexpensive structure.

To achieve this object, the present invention creates an inspection device of the type mentioned at the outset, which is characterized in that it has at least three elongate skid bodies, extending in a circumferential direction and parallel to each other and connected to each other, which define contact surfaces for placing on the circumferential surface of the object to be inspected, wherein a probe receiver for an ultrasonic probe is provided at least on the middle skid body. For the purpose of performing a non-destructive inspection, the skid bodies are placed with their contact surfaces on the circumferential surface of the rotor, whereupon an ultrasonic probe arranged on the probe receiver can perform measurements in order to detect cracks. The relative movement between the inspection device, or the ultrasonic probe held on it, and the rotor may be effected by manually pushing the skid bodies along the rotor circumferential surface. Alternatively, it is also possible to fix the inspection device in a tangential position relative to the rotor circumferential surface and rotate the rotor. The latter variant is used, in particular, if the rotor is already rotatably mounted on appropriate bearing blocks for the purpose of performing other maintenance or repair work, such that neither additional work nor additional costs are incurred in this respect.

The inspection device according to the invention is characterised by its particularly simple structure and low net weight. Owing to the skid bodies, in comparison with wheels a large contact surface is provided, such that the inspection device can be guided over the rotor circumferential surface with high accuracy.

According to a design of the present invention, the at least three skid bodies are connected to each other via at least two guide rods extending parallel to each other in an axial direction, on which the skid bodies are held so as to be displaceable in an axial direction and lockable in any position. Owing to this construction, the distance between the skid bodies can be easily altered to enable the inspection device to be adapted to differently designed rotor circumferential surfaces. The radial distance between the contact surfaces of the skid bodies and the guide rods is advantageously at least 12 mm, better still at least 20 mm, in order to be able to pass over with sufficient play projections that project radially from the rotor circumferential surface, which are formed, for example, by sealing strips extending in a circumferential direction. A further advantage of the skid body arrangement on the two guide rods is that the skid bodies can be easily exchanged. Optimally shaped skid bodies can thus always be used for each axial position of a rotor.

Advantageously, realized in the skid bodies are through-holes that receive the guide rods are, such that very simple set-up can be achieved. Advantageously leading into each trough-hole is a threaded bore, accessible from the outside, for receiving a setscrew that serves to fasten a skid body in the desired position.

The contact surfaces of the skid bodies are advantageously realized in the form of a ring segment, the radius of the ring segment substantially corresponding to the outer radius of the rotor at the position at which the corresponding skid body is to be placed on the rotor. In this way a flat, and thus very good, contact between the skid bodies and the rotor is created. Alternatively, the contact surfaces of the skid bodies may also be realised in the manner of a prism, such that two line contacts to the rotor are realised per skid body. The contact area between skid body and rotor is thereby reduced. However, the skid bodies can be placed on different outer diameters of the rotor, which is beneficial for the flexible use of the skid bodies.

The probe receiver of the middle skid body is advantageously provided in the form of a receiving bore extending radially upward from its contact surface, into which there leads, in particular, a threaded bore, accessible from the outside, for receiving a clamping screw. Owing to such a receiving bore, the probe can be easily mounted and fastened by means of the clamping screw.

Advantageously, an outlet opening of a couplant supply channel leads into the contact surface of the middle skid body, adjacent to the probe receiver, wherein the inlet opening of the couplant supply channel is advantageously provided on the upper side of the middle skid body, and in particular is realized with an internal thread for connecting a couplant supply line. The automatic supply of a couplant during the execution of a measurement facilitates the handling of the inspection device.

According to a design of the present invention, at least one of the two outer skid bodies has, in the lower region of its side facing the other skid bodies, a recess, extending continuously in a circumferential direction, in the form of a groove open on two sides, the wall of which facing the other skid bodies defines a contact surface for contact with a radially projecting shoulder of the object to be inspected. This improves the grip and guidance of the inspection device on the object to be inspected. The holding and guiding of the inspection device on the object to be inspected is thereby improved.

Advantageously, at least one of the two outer skid bodies has a further probe receiver, in particular in the form of a receiving bore extending radially upward from its contact surface, into which advantageously there leads a threaded bore, accessible from the outside, for receiving a clamping screw. The provision of a plurality of probes enables the accuracy of the measurements to be significantly improved. The second probe in this case may have a lesser power and/or sensitivity than the first probe, which is arranged on the middle skid body.

Advantageously, arranged on the contact surface and/or on the contact surface of at least one outer skid body there are magnets, which in particular are embedded in magnet receiving bores. Owing to such magnets, the skid bodies are held securely on the rotor after having been placed thereon, such that it is possible to dispense with manual pressing.

The skid bodies are advantageously made of a plastic material, in particular by use of an additive manufacturing process such as, for example, the photo-polymerisation process. Different skid bodies can thus be produced easily, quickly and inexpensively for a great variety of geometric conditions on the rotor.

According to a design of the present invention, the inspection device has a travel transducer to enable circumferential positions on the rotor to be assigned to the measured values recorded by the probe or probes.

The travel transducer advantageously comprises a magnetic wheel, which can be positioned in such a manner that it rolls in a circumferential direction on the circumferential surface of the object to be inspected, wherein the diameter and the fastening of the magnetic wheel are advantageously selected in such a manner that a radial play of at least 12 mm is left in order to be able to pass over with sufficient play projections that project radially from the rotor circumferential surface, which are formed, for example, by sealing strips extending in a circumferential direction.

The magnetic wheel is advantageously positioned rotatably on a holding arm, extending in a circumferential direction, that can be displaced axially and locked in any position on one of the previously described guide rods. A simple and inexpensive set-up is thereby achieved.

Advantageously, a holding means is provided, which is designed to receive a fixing element for fixing the inspection device in a position tangential to the object to be inspected. Such a fixing element, which for example may be in the form of a holding rod, and may itself in turn be held on a stationary stand, is used when the relative movement between the at least one probe of the inspection device and the rotor to be inspected is realised by rotating the rotor.

Furthermore, the present invention creates a method for non-destructive inspection of rotationally symmetrical objects, in particular rotors of gas or steam turbines, by use of an inspection device according to the invention.

Further features and advantages of the inspection device according to the invention are disclosed by the following description of an inspection device according to an embodiment of the present invention with reference to the accompanying drawing.

DETAILED DESCRIPTION OF INVENTION

Figure 1:
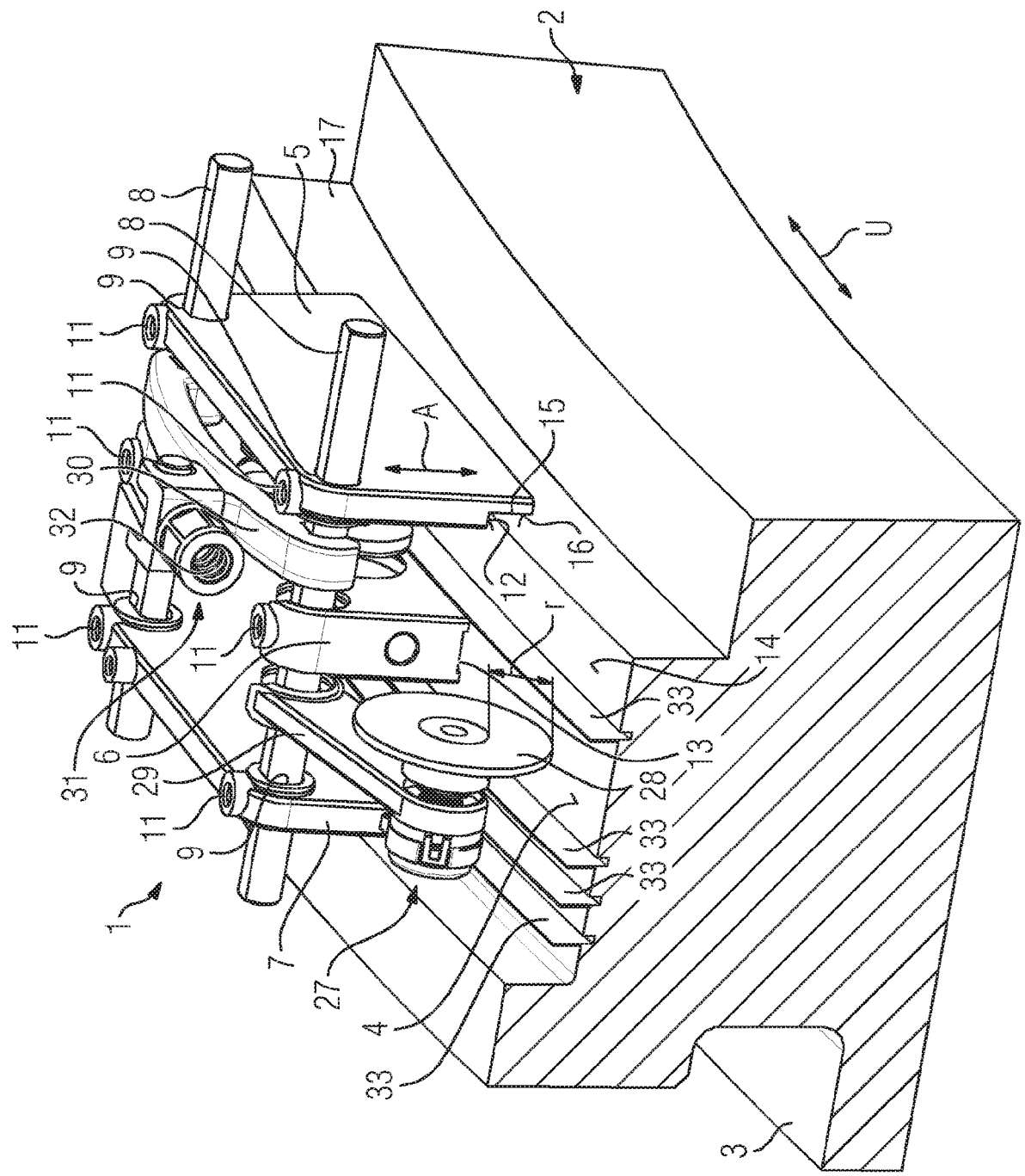
FIG. 1 is perspective view of an inspection device according to an embodiment of the present invention, which is placed on a rotor of a turbine to be inspected, only a part of the rotor being shown for better representation.
Figure 2:
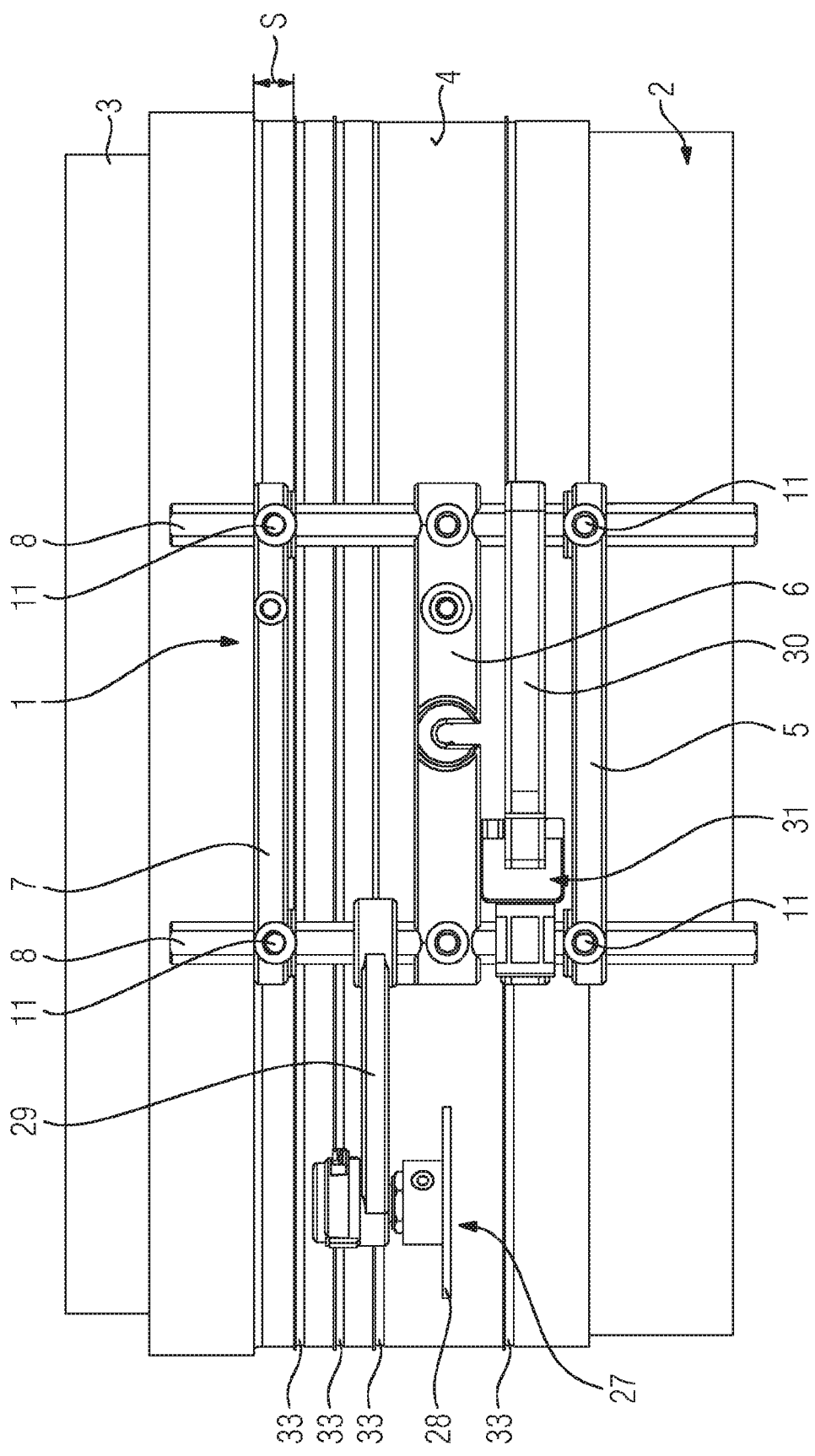
FIG. 2 is a top view of the arrangement shown in FIG. 1.
Figure 3:
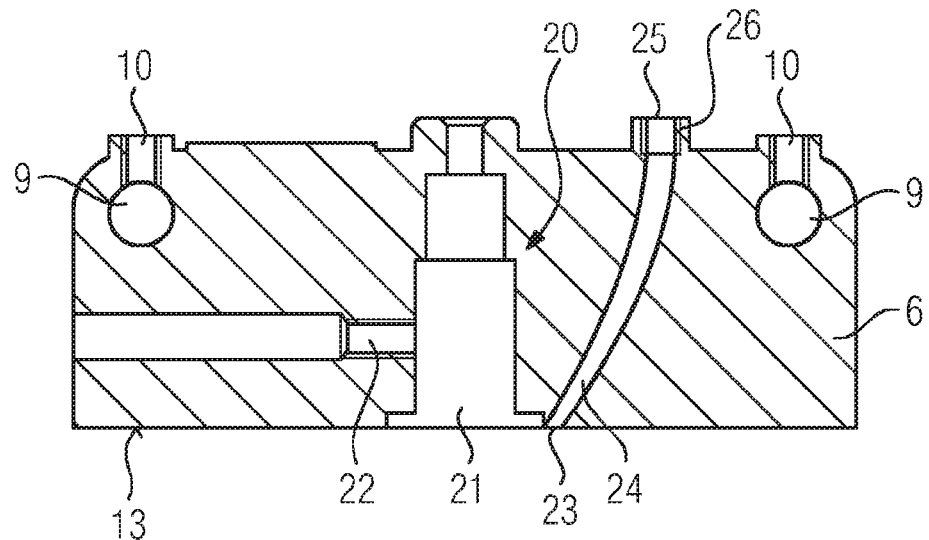
FIG. 3 is a side view of a middle skid body of the inspection device represented in FIG. 1.
Figure 4:
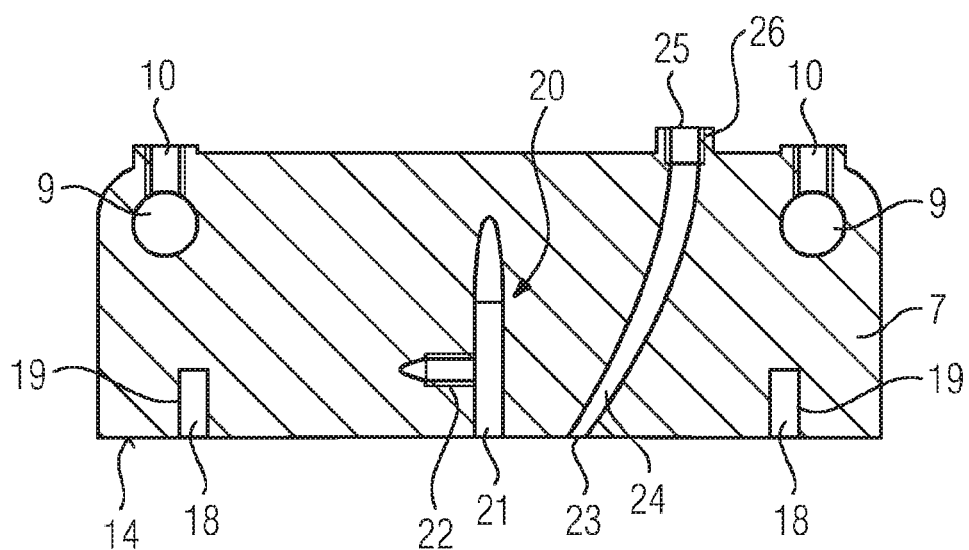
FIG. 4 is a side view of an outer skid body of the inspection device represented in FIG. 1.

In the following, components that are the same, or of similar design, are denoted by the same references.

The inspection device 1 is used for the non-destructive inspection of rotationally symmetrical objects, in particular rotors 2 of gas or steam turbines. More precisely, the inspection device 1 is used to detect cracks in the region of blade grooves 3 of rotor 2 that accommodate blades. The direction specifications stated below refer to the arrangement represented in FIG. 1, in which the inspection device 1 is placed on a circumferential surface 4 of rotor 2.

The inspection device 1 in this case comprises of three elongate skid bodies 5, 6 and 7, which extend in a circumferential direction U and parallel to each other, and which are each realized in the form of a plate. The plate thickness S of at least the outer two skid bodies 5 and 7 is advantageously in the range of between 5 and 10 mm, whereas the plate thickness S of the middle skid body 6 is advantageously greater than that of the other two skid bodies 5 and 7. The three skid bodies 5, 6 and 7 are connected to each other via two guide rods 8 that extend parallel to each other in an axial direction A, in such a manner that the skid bodies 5, 6 and 7 can be displaced in the axial direction A and can be locked in any position on the guide rods 8. For this purpose, the skid bodies 5, 6 and 7 are provided with through-holes 9, which receive the guide rods 8 and which are each realized in the upper region of the skid bodies 5, 6 and 7. Leading into each of the through-holes 9 there is a threaded bore 10, accessible from the outside, for receiving a setscrew 11. Following slackening of the setscrews 11, the skid bodies 5, 6 and 7 can be displaced correspondingly freely in axial direction A along the guide rods 8 and then, after a desired position has been reached, can be fixed in placed by tightening of the setscrews 11. In the lower region the skid bodies 5, 6 and 7 respectively define contact surfaces 12, 13 and 14 for placing on the circumferential surface 4 of rotor 2. In this case the contact surfaces 12, 13 and 14 are each realized in the form of a ring segment, the diameter of the ring segment corresponding to the outer diameter of the rotor 2 at the position at which the corresponding skid body 5, 6 or 7 is to be positioned on the circumferential surface 4 of rotor 2. Alternatively, however, it is also possible to realize the contact surfaces 12, 13 and 14 in the manner of a prism, such that the contact surfaces 12, 13 and 14 can also be easily placed on different outer diameters of rotor 2.

In the lower area of its side that faces toward the other skid bodies 6 and 7, the front outer skid body 5 has a recess 15, extending continuously in circumferential direction U, in the form of a groove open on two sides, the wall of which facing toward the other skid bodies 6 and 7 defines a contact surface 16 for contact with a radially projecting shoulder 17 of rotor 2. Furthermore, are arranged on the contact surface 12 and on the contact surface 16 of the front outer skid body 5 there are magnets 18, which are embedded in corresponding magnet receiving bores 19.

The middle skid body 6 comprises a probe receiver 20, arranged approximately centrally, in the form of a receiving bore 21 extending radially upwards from its contact surface 13, into which there leads a threaded bore 22, accessible from the outside, in the present case extending transversely in relation to the circumferential direction U, for receiving a clamping screw. The probe receiver 20 serves to receive an ultrasonic probe, not represented in detail in this case, which is advantageously a multi-channel ultrasonic probe. Leading into the contact surface 13 of the middle skid body 6 there is an outlet opening 23 of a couplant supply channel 24, adjacent to the probe receiver 20, the inlet opening 25 of the couplant supply channel 24 being provided on the upper side of the middle skid body 6, and being realized with an internal thread 26 to enable connection of a couplant supply line, not represented in detail.

The rear outer skid body 7, which is arranged such that it faces toward the blade groove 3 when the inspection device 1 is placed on a rotor 2, is likewise provided with a probe receiver 20 in the form of a receiving bore 21, extending radially upwards from its contact surface 14, into which there leads a threaded bore 22, accessible from the outside, for receiving a clamping screw. The probe receiver 20 of the rear outer skid body 7 is somewhat smaller than that of the middle skid body 6, as the ultrasonic probe to be accommodated likewise has smaller external dimensions. As in the case of the middle skid body 6, in the case of the skid body 7 also the outlet opening 23 of a couplant supply channel 24 leads into the contact surface 14, adjacent to receiving bore 21. In addition, as is the case with the front outer skid body 5, the rear outer skid body 7 is also provided with magnets 18 embedded in magnet receiving bores 19 and approximately flush with contact surface 14. Even if this is not the case here, the rear outer skid body 7 may be provided with a contact surface 16 facing toward the other skid bodies 5 and 6, in the same way as the front outer skid body 5, if this is beneficial for positioning the inspection device 1 on the rotor 2.

The inspection device 1 further comprises a travel transducer 27 having a magnetic wheel 28, which is positionable in such a manner that it rolls on the circumferential surface 4 of the rotor 2, the diameter and the fastening of the magnetic wheel 28 being selected so as to leave a radial play r of at least 12 mm. The magnetic wheel 28 in this case is positioned rotatably on a holding arm 29, extending in a circumferential direction U, which is axially displaceable and lockable in any position on one of the guide rods 8. Accordingly, the magnetic wheel 28 is positioned, in a circumferential direction U, at a distance from the skid bodies 5, 6 and 7.

In the case of the present embodiment, the guide rods 8 are fastened to each other by connecting rod 30 realized in the manner of stirrup. Provided on the connecting rod 30 is a holding means 31, which is designed for receiving a fixing element for fixing the inspection device 1 in a position tangential to the rotor 2. The holding means 31 is held on the connecting rod 30 such that it can swivel about an axially extending swivel axis, and defines an internal thread 32, into which a matching external thread of the fixing element, not represented in detail, can be screwed, which is realized, for example, in the form of a holding rod and is designed for fixing to a stand that can be erected in a stationary manner.

For non-destructive inspection of rotor 2 in respect of crack formation in the region of a blade groove 3, the inspection device 1 according to FIG. 1 is placed on the circumferential surface 4 of the rotor 2 in such a manner that the skid bodies 5, 6 and 7 face in a circumferential direction U. It is to be ensured in this case that the rear outer skid body 7 faces toward the blade groove 3. The respective distances between the skid bodies 5, 6 and 7 are, or are adjusted in such a manner, that the rear outer skid body 5 and the middle skid body 6 engage between projections formed by radially projecting sealing strips 32, and the contact surface 16 bears against the shoulder 17 of the rotor 2 from the outside. The magnets 18 now hold the skid bodies 5, 6 and 7 firmly on the rotor 2. The magnetic wheel 28 is then placed on the circumferential surface 4 of the rotor 2. The distance a, and also the radial play r, are selected in such a manner that is no unwanted collision of the inspection device 1 with radially upwardly projecting sealing strips 33 of the rotor 2.

In a further step, the inspection device 1 positioned thus is moved in a circumferential direction U relative to the blade groove 3, in order to perform the usual measurements by use of the ultrasonic probes, with couplant being supplied continuously via the couplant feed channels 24. During this movement, the travel transducer 27 records the distance travelled, such that the recorded measured values can be assigned to corresponding circumferential positions of the rotor 2.

The relative movement between inspection device 1 and the rotor 2 is effected, in the case of a stationary rotor 2, by manually displacing the inspection device 1 over the circumferential surface 4 of the rotor 2. Alternatively, the inspection device 1 may be fixed in the tangential position represented in FIG. 1 by use of the holding means 31. For this purpose, a suitable fixing element is accommodated on the holding means 31, the fixing element, in turn, being fastened in a stationary manner, for example on a stand. The relative movement is then realised by rotating the rotor 2.

Although the invention has been illustrated and described in detail on the basis of the advantageous embodiment, the invention is not restricted by the examples disclosed, and other variations may be derived by persons skilled in the art, without departure from the scope of protection of the invention.

The invention claimed is:

1. An inspection device for non-destructive inspection of rotationally symmetrical objects or rotors of gas or steam turbines, comprising:
   at least three elongate skid bodies, extending in a circumferential direction and parallel to each other and connected to each other, which define contact surfaces for placing on the circumferential surface of the object to be inspected, and a probe receiver for an ultrasonic probe which is provided at least on the middle skid body.

2. The inspection device as claimed in claim 1, wherein the at least three skid bodies are connected to each other via at least two guide rods extending parallel to each other in an axial direction, on which the skid bodies are held so as to be displaceable in an axial direction and lockable in any position, wherein a radial distance between the contact surfaces of the skid bodies and the guide rods is at least 12 mm.

3. The inspection device as claimed in claim 2, wherein realized in the skid bodies are through-holes that receive the guide rods and leading into each of which is a threaded bore, accessible from the outside, for receiving a setscrew.

4. The inspection device as claimed in claim 1, wherein the contact surfaces are realized in the form of a ring segment or in the manner of a prism.

5. The inspection device as claimed in claim 1, wherein the probe receiver of the middle skid body is provided in the form of a receiving bore extending radially upward from its contact surface.

6. The inspection device as claimed in claim 1, wherein an outlet opening of a couplant supply channel leads into the contact surface of the middle skid body, adjacent to the probe receiver, wherein an inlet opening of the couplant supply channel is provided on an upper side of the middle skid body.

7. The inspection device as claimed in claim 1, wherein at least one of the two outer skid bodies has, in the lower region of its side facing the other skid bodies, a recess, extending continuously in a circumferential direction, in the form of a groove open on two sides, the wall of which facing the other skid bodies defines a contact surface for contact with a radially projecting shoulder of the object to be inspected.

8. The inspection device as claimed in claim 1, wherein at least one of the two outer skid bodies has a further probe receiver, extending radially upward from its contact surface.

9. The inspection device as claimed in claim 1, wherein arranged on the contact surface and/or on the contact surface of at least one outer skid body there are magnets, which are embedded in magnet receiving bores.

10. The inspection device as claimed in claim 1, wherein the skid bodies are made of a plastic material, by use of a photo-polymerisation process.

11. The inspection device as claimed in claim 1, further comprising:

a travel transducer.

12. The inspection device as claimed in claim 11, wherein the travel transducer comprises a magnetic wheel, configured to which can be positioned in such a manner that it rolls in a circumferential direction on the circumferential surface of the object to be inspected, wherein a diameter and the fastening of the magnetic wheel are selected in such a manner that a radial play of at least 12 mm is left.

13. The inspection device as claimed in claim 12, wherein the at least three skid bodies are connected to each other via at least two guide rods extending parallel to each other in an axial direction, on which the skid bodies are held so as to be displaceable in an axial direction and lockable in any position; and wherein the magnetic wheel is positioned rotatably on a holding arm, extending in a circumferential direction, configured to be displaced axially and locked in any position on one of the guide rods.

14. The inspection device as claimed in claim 1, further comprising:

a holding means, which is designed to receive a fixing element for fixing the inspection device in a position tangential to the object to be inspected.

15. A method for non-destructive inspection of rotationally symmetrical objects or rotors of gas or steam turbines, comprising:

using an inspection device as claimed in claim 1 for non-destructive inspection.

16. The inspection device as claimed in claim 2, wherein the radial distance between the contact surfaces of the skid bodies and the guide rods is at least 20 mm.

17. The inspection device as claimed in claim 5, wherein the probe receiver of the middle skid body is provided in the form of a receiving bore extending radially upward from its contact surface, into which there leads a threaded bore accessible from the outside, for receiving a clamping screw.

18. The inspection device as claimed in claim 6, wherein the inlet opening of the couplant supply channel is provided on the upper side of the middle skid body and is realized with an internal thread.

19. The inspection device as claimed in claim 8, wherein the further probe receiver is in the form of a receiving bore.

20. The inspection device as claimed in claim 19, wherein the receiving bore extends radially upward from its contact surface into which there leads a threaded bore, accessible from the outside, for receiving a clamping screw.

* * * * *